(12) United States Patent
Chou et al.

(10) Patent No.: US 7,579,720 B2
(45) Date of Patent: Aug. 25, 2009

(54) ORIGIN MICROADJUSTMENT MECHANISM FOR A LINEAR MOTOR

(75) Inventors: Chi-Pin Chou, Taichung (TW); Tsang-Chou Lee, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 294 days.

(21) Appl. No.: 11/627,968

(22) Filed: Jan. 28, 2007

(65) Prior Publication Data

US 2008/0179970 A1   Jul. 31, 2008

(51) Int. Cl.
*H02K 41/00* (2006.01)
(52) U.S. Cl. .............................. 310/12; 310/13; 310/15
(58) Field of Classification Search .................. 310/12, 310/13, 15, 91
See application file for complete search history.

(56) References Cited

U.S. PATENT DOCUMENTS

| | | | | | |
|---|---|---|---|---|---|
| 3,640,138 | A | * | 2/1972 | Hahn et al. | 74/89.32 |
| 4,916,963 | A | * | 4/1990 | Takei | 74/89.31 |
| 5,195,391 | A | * | 3/1993 | Barbat et al. | 74/89.22 |
| 6,806,597 | B2 | * | 10/2004 | Kondo | 310/49 R |

* cited by examiner

*Primary Examiner*—Thanh-Tam T Le
(74) *Attorney, Agent, or Firm*—Banger Shia

(57) ABSTRACT

An origin microadjustment mechanism for a linear motor is assembled on a stator of the linear motor and comprises a load bearing member fixed to a sensing member and two positioning seats. The load bearing member is movably passed through the positioning seats, and the positioning seats are fixed to the stator, so as to adjust the position of the sensing member relative to the stator.

4 Claims, 6 Drawing Sheets

ORIGIN MICROADJUSTMENT MECHANISM FOR A LINEAR MOTOR

BACKGROUND OF THE INVENTION

1. Field of the Invention

The present invention relates to a linear motor, and more particularly to an origin microadjustment mechanism for a linear motor 2. Description of the Prior Art Referring to FIG. 1, a conventional uniaxial linear motor comprises a stator 10, a mover 11 and a sensing member S fixed on the stator 10, and the sensing member S serves to sense the motion of the mover 11. When the mover 11 is moving on the stator 10, the sensing member S serves as an origin of the displacement of the mover 11, so as to calculate the distance the mover 11 moved on the stator 10. And then with the cooperation of an appropriate program, the mover 11 can be set to reciprocate within a fixed range on the stator 10.

Another conventional gantry linear motor is shown in FIG. 2, at a corresponding position of each of two parallel stators 20 is fixed a sensing member S which serves to sense the motion of the mover 21 moving on the stators 20. In addition, the sensing member S serves as an origin of the displacement of the mover 21, so as to calculate the distance that the mover 21 moved on the stator 10.

However, the fixing methods of the sensing members S of the above-mentioned linear motors have some disadvantages. For example, as far as the uniaxial linear motor is concerned, the sensing member S is fixed on the stator 10 by adhesive, as a result, when the position of the sensing member S needs to be adjusted, the sensing member S has to be removed and then re-fixed by adhesive, it is inconvenient.

In addition, with respect to the conventional gantry linear motor, the sensing members S are fixed on the stators 20 by adhesive separately, so it is difficult to make the sensing members S located correspondingly to each other, and they are likely to be located at the wrong positions. At that time, one of the sensing members S has to be removed and then re-fixed by adhesive, it is hard to assemble.

The present invention has arisen to mitigate and/or obviate the afore-described disadvantages.

SUMMARY OF THE INVENTION

The primary objective of the present invention is to provide an origin microadjustment mechanism for a linear motor, wherein a sensing member is fixed on a load bearing member that is movable relative to a stator.

An origin microadjustment mechanism for a linear motor comprises two positioning seats, a load bearing member and a sensing member. The positioning seats are fixed on the stator respectively, the sensing member is fixed on the load bearing member, and the load bearing member is movably passed through the positioning seats. Thereby, the position of the sensing member relative to the stator can be adjusted by moving the load bearing member, so as to change the origin of the linear motor.

Further, the load bearing member of the present invention has a positioning post and a base. Both ends of the positioning post are passed through the positioning seats respectively, and the base is fixed to the positioning post by screws. By such arrangements, by adjusting the position of the base fixed to the positioning post, or by adjusting the position of the positioning post passed through the positioning seats, the position of the sensing member relative to the stator can be adjusted. In addition, in one side of the load bearing member is formed plural teeth, and a knob is disposed on the stator and is formed with a plurality of teeth for engaging with the teeth of the load bearing member. Thereby, by rotating the knob, the teeth of the knob can drive the teeth of the load bearing member so as to move the load bearing member relative to the positioning seats, thus adjusting the position of the sensing member relative to the stator.

Moreover, the positioning seats of the present invention can be fixed to the stator by screws, such that the distance the load bearing member moved on the positioning seats can be changed easily by adjusting the position of the positioning seats relative to the stator, so as to adjust the range between the sensing member and the stator.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
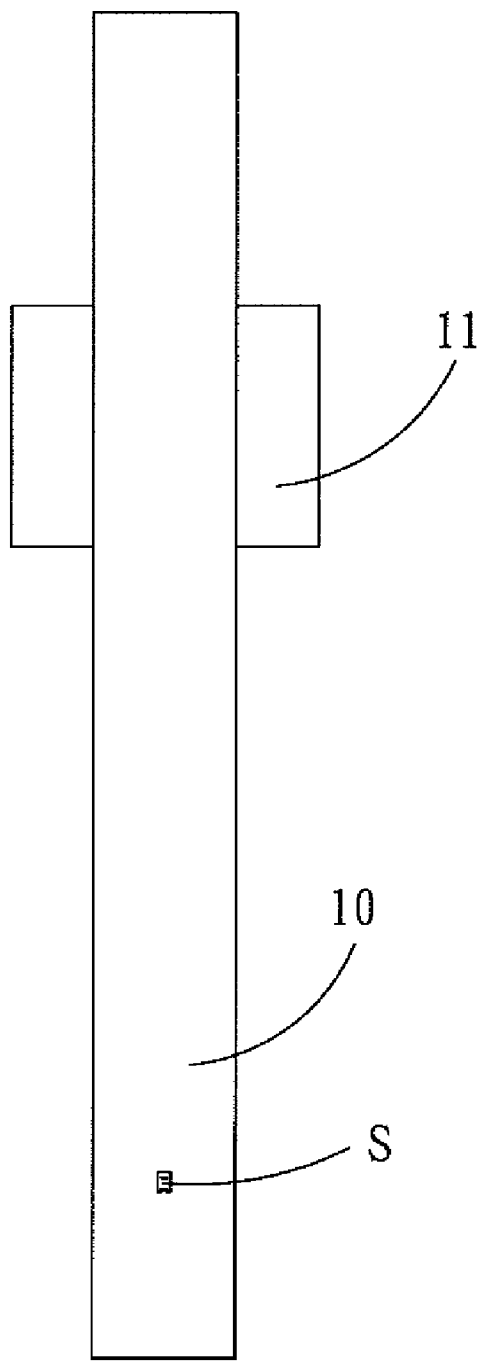
FIG. 1 is an illustrative view of a conventional uniaxial linear motor.
Figure 2:
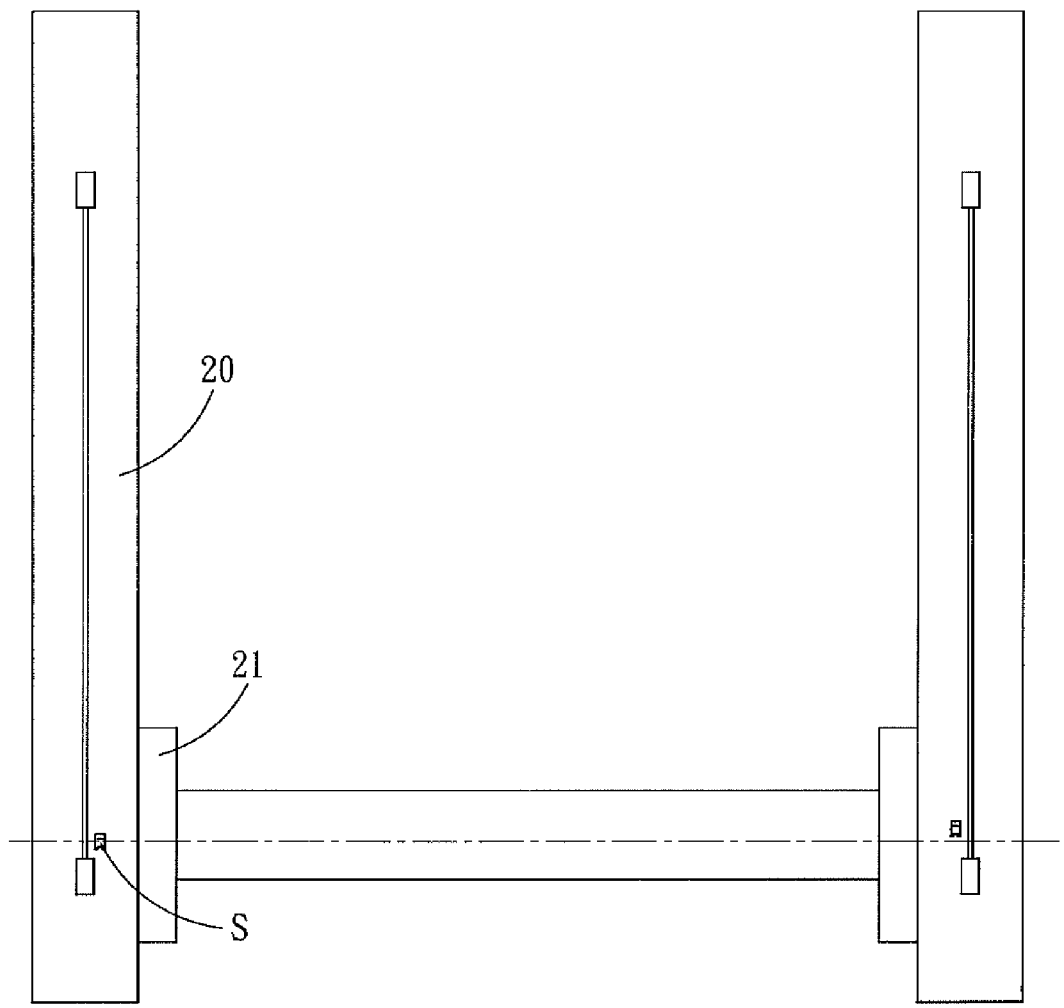
FIG. 2 is an illustrative view of a conventional gantry linear motor.
Figure 3:
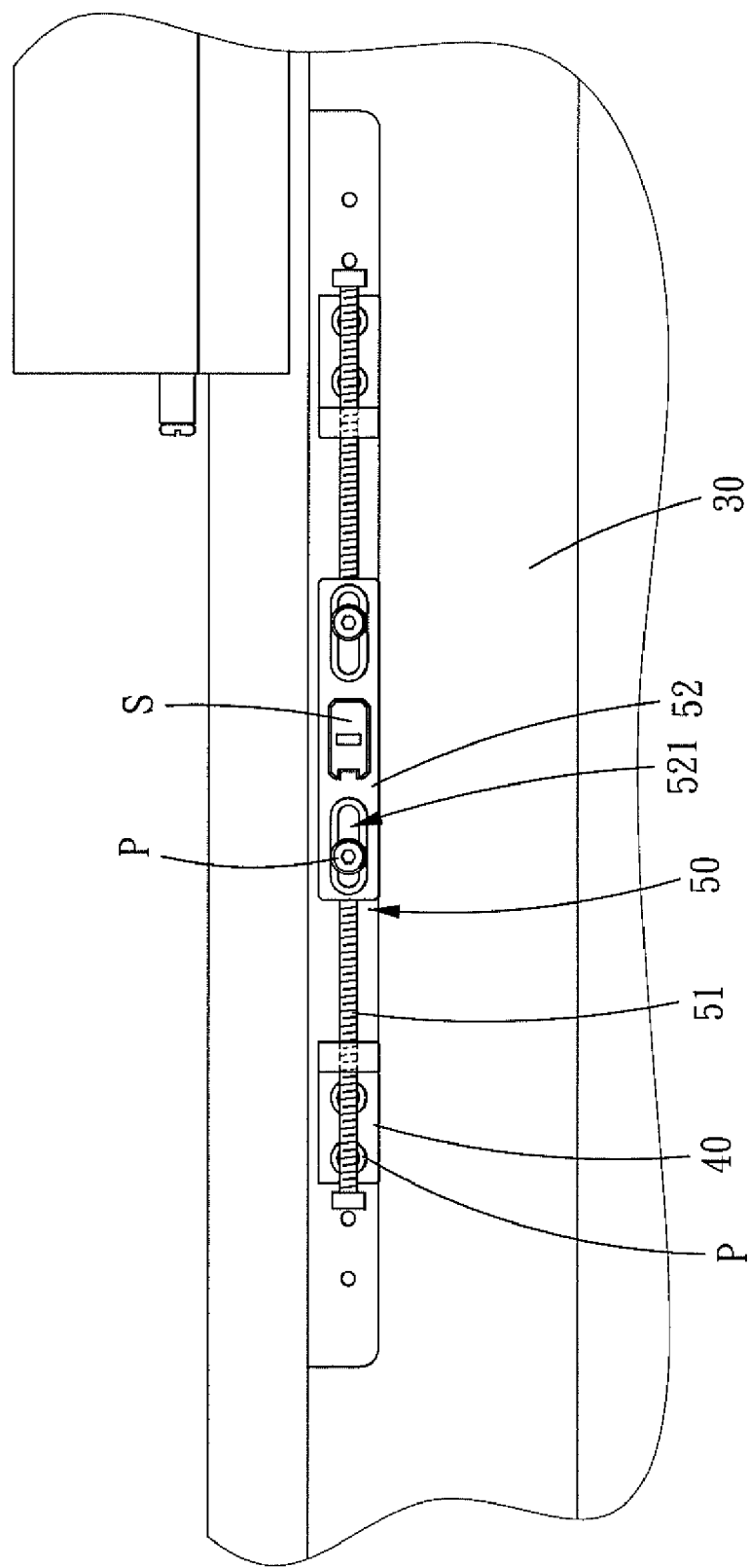
FIG. 3 is a side view in accordance with the present invention of showing that an origin microadjustment mechanism for a linear motor is assembled on a stator.
Figure 4:
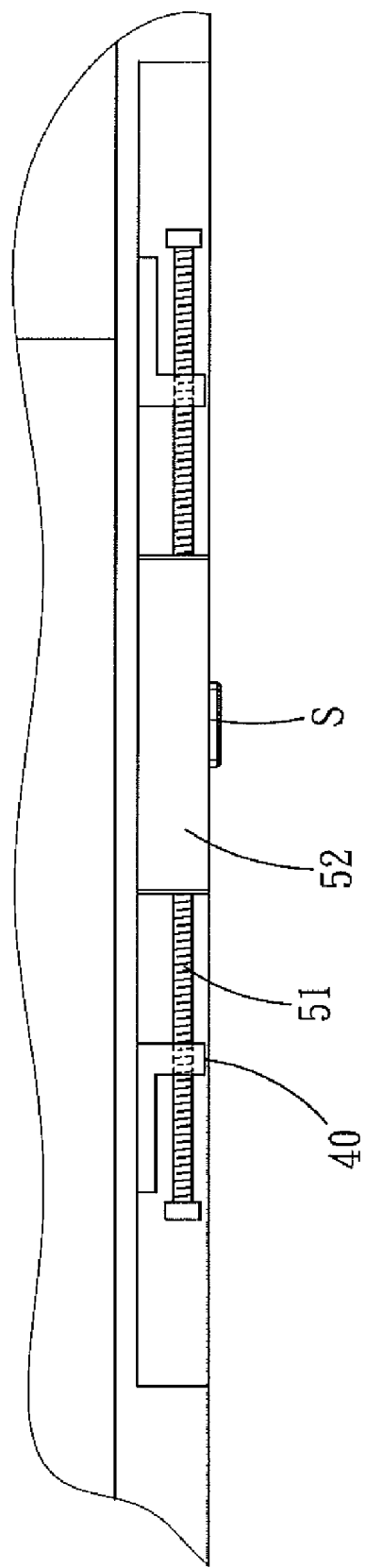
FIG. 4 is a vertical view in accordance with the present invention of showing that the origin microadjustment mechanism for a linear motor is assembled on the stator.

Referring to FIGS. 3 and 4, an origin microadjustment mechanism for a linear motor in accordance with the present invention is assembled on a stator 30 of the linear motor and comprises: two positioning seats 40, a load bearing member 50, and a sensing member S.

The two positioning seats 40 are fixed on the stator 30 by screws P respectively.

The load bearing member 50 with both ends inserted through the positioning seats 40 is moveable relative to the positioning seats 40. The load bearing member 50 has a positioning post 51 and a base 52, both ends of the positioning post 51 are movably passed through the positioning seats 40 respectively. The base 52 is defined with two elongated through holes 521 through which the base 52 is fixed to the positioning post 51 by screws P.

The sensing member S is fixed on the load bearing member 50, and in this embodiment, the sensing member S is fixed to the base 52.

Figure 5:
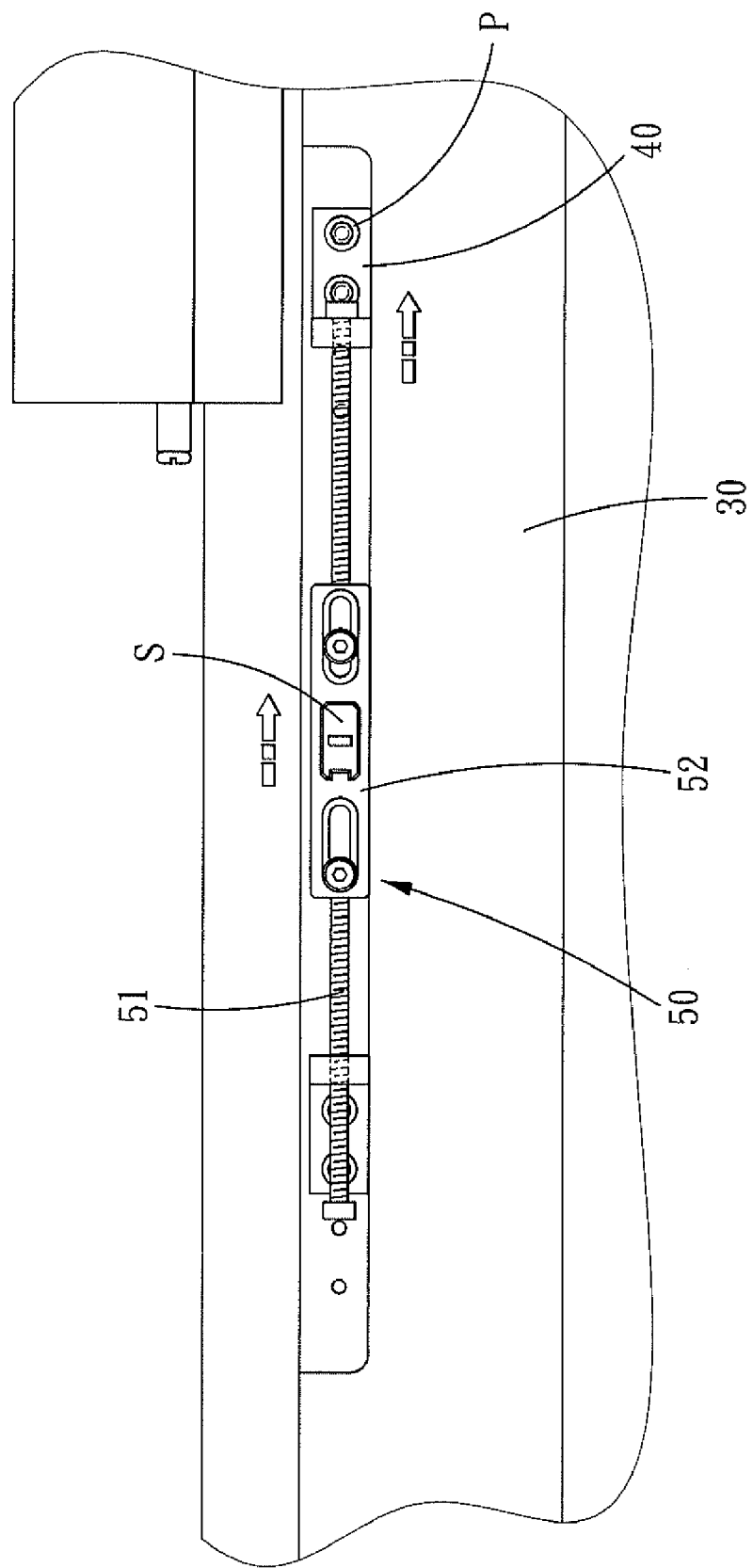
FIG. 5 is an illustrative view in accordance with the present invention of showing the adjustment of a base and two positioning seats.

As can be clearly seen from the above-mentioned structure, and with reference to FIG. 5, the position of the base 52 on the positioning post 51 can be adjusted after the screws P of the base 52 are loosed. And then fix the base 52 to the positioning post 51 by tightening the screws P, in this way, the position of the base 52 is adjusted. And consequently the position of the sensing member S relative to the stator 30 is also adjusted, thus changing the origin of the linear motor. In addition, the position of the sensing member S with respect to the stator 30 can also be adjusted by adjusting the position of the positioning post 51 passed through the positioning seats 44, thus changing the origin of the linear motor.

In this way, even if the sensing member S is deviated to cause the deviation of the origin of the linear motor, or the position of the origin is required to be adjusted, it is unnecessary to fix the sensing member S on stators 10 and 20 by adhesive, and the present invention only needs to choose one of the adjusting methods to change the position of the origin.

In addition, as shown in FIG. 5, the stator 30 of the present invention can be formed with a plurality of threaded holes, and the positioning seats 40 are fixed to the stator 30 by the screws P, such that the distance the load bearing member 50 moved on the positioning seats 40 can be changed easily by adjusting the position of the positioning seats 40 relative to the stator 30, so as to adjust the range between the sensing member S and the stator 30.

Figure 6:
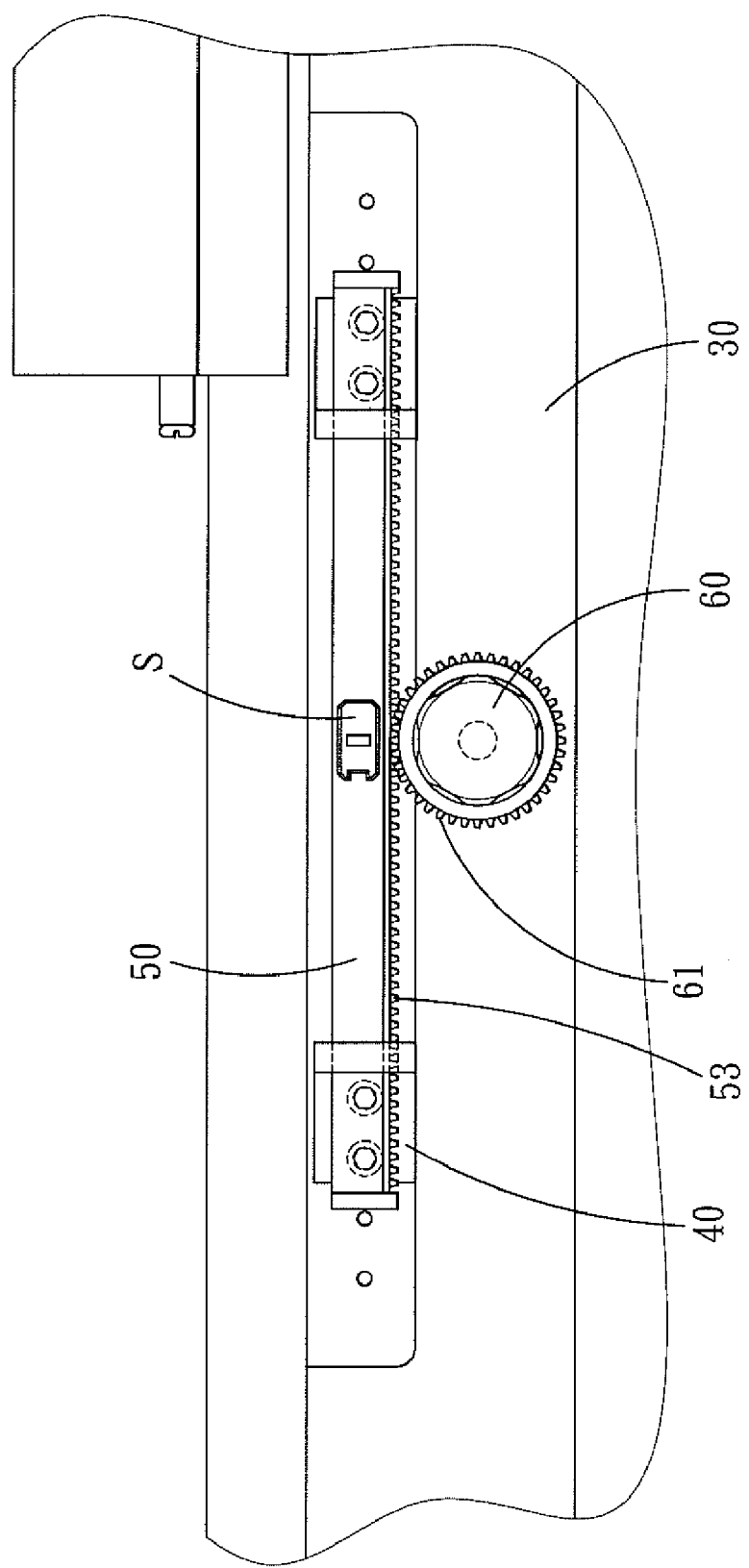
FIG. 6 is an illustrative view in accordance with the present invention of showing a load bearing member formed with plural teeth.

Further, as shown in FIG. 6, the load bearing member 50 of the present invention also can be plate-shaped, and in one side of the load bearing member 50 is formed plural teeth 53. A knob 60 is pivotally disposed on the stator 30, and a plurality of teeth 61 is formed on the knob 60 for engaging with the teeth 53. Thereby, by rotating the knob 60, the teeth 61 can drive the teeth 53 of the load bearing member 50 so as to move the load bearing member 50 relative to the positioning seats 40, and thus the position of the sensing member S relative to the stator 30 and the origin of the linear motor are adjusted.

To summarize, an origin microadjustment mechanism for a linear motor in accordance with the present invention is assembled on a stator of the linear motor and comprises a load bearing member fixed to a sensing member and two positioning seats. The load bearing member is movably passed through the positioning seats, and the positioning seats are fixed on the stator, so as to adjust the position of the sensing member relative to the stator.

While we have shown and described various embodiments in accordance with the present invention, it should be clear to those skilled in the art that further embodiments may be made without departing from the scope of the present invention.

What is claimed is:

1. An origin microadjustment mechanism for a linear motor, comprising:
   two positioning seats fixed on a stator respectively;
   a load bearing member movably passed through the positioning seats; and
   a sensing member fixed on the load bearing member, and a position of the sensing member relative to the stator is adjusted by adjusting the position of the load bearing member passed through the positioning seats;
   in one side of the load bearing member is formed plural teeth, a knob is pivotally disposed on the stator, and a plurality of teeth is formed on the knob for engaging with the teeth of the load bearing member.

2. The origin microadjustment mechanism for a linear motor as claimed in claim 1, wherein the load bearing member has a positioning post and a base, both ends of the positioning post are passed through the positioning seats respectively, and the base is fixed to the positioning post.

3. The origin microadjustment mechanism for a linear motor as claimed in claim 2, wherein the base is fixed to the positioning post by screws.

4. The origin microadjustment mechanism for a linear motor as claimed in claim 1, wherein the stator is formed with a plurality of threaded holes, and the positioning seats are fixed to the stator by screws.

\* \* \* \* \*